US006410769B1

(12) United States Patent
Eichenauer et al.

(10) Patent No.: US 6,410,769 B1
(45) Date of Patent: Jun. 25, 2002

(54) GRANULAR ORGANOSILANE PREPARATION, PROCESS FOR THE PRODUCTION THEREOF AND USE THEREOF

(75) Inventors: Kurt Eichenauer, Bad Soden-Salmünster; Holger Pitsch, Mainhausen; Michael Klose, Frankfurt am Main; Conny Vogler, Bornheim-Sechtem; Jan Kopietz, Hürth-Efferen; Helmut Kriesch, Frechen, all of (DE)

(73) Assignee: Degussa Muls AG, Frankfurt am Main (DE)

( * ) Notice: Subject to any disclaimer, the term of this patent is extended or adjusted under 35 U.S.C. 154(b) by 0 days.

(21) Appl. No.: 09/715,038

(22) Filed: Nov. 20, 2000

(30) Foreign Application Priority Data

Nov. 20, 1999 (DE) ........................................ 199 55 850

(51) Int. Cl.$^7$ ................................................. C07F 7/08
(52) U.S. Cl. .................... 556/427; 556/466; 106/287.1; 106/287.14; 106/287.16; 525/342
(58) Field of Search ................................ 556/466, 427; 106/475, 287.1, 287.14, 287.16; 525/342

(56) References Cited

U.S. PATENT DOCUMENTS

| 3,842,111 | A | * | 10/1974 | Meyer-Simon et al. ..... 556/427 |
| 3,997,356 | A | * | 12/1976 | Thurn et al. ............. 556/427 X |
| 4,128,438 | A | * | 12/1978 | Wolff et al. ......... 106/287.14 X |
| 5,653,794 | A | * | 8/1997 | Weber et al. ................ 106/475 |
| 6,214,106 | B1 | * | 4/2001 | Weber et al. ................ 106/475 |
| 6,231,624 | B1 | | 5/2001 | Vogler et al. |
| 6,268,421 | B1 | | 7/2001 | Dittrich et al. |

FOREIGN PATENT DOCUMENTS

| DE | 1 592 861 | 2/1971 |
| DE | 27 47 277 | 4/1979 |
| DE | 44 35 311 | 4/1996 |
| DE | 196 21 462 | 12/1997 |
| DE | 196 23 198 | 12/1997 |

OTHER PUBLICATIONS

English language abstract of OR above.

English language abstract of PR above.

English language abstract of QR above.

English language abstract of RR above.

English language abstract of SR above.

* cited by examiner

*Primary Examiner*—Paul F. Shaver
(74) *Attorney, Agent, or Firm*—Pillsbury Winthrop LLP

(57) ABSTRACT

An organosilane preparation, comprising a mixture of one or more organosilanes and one or more fillers, has a fines content of less than 2%.

11 Claims, 3 Drawing Sheets

GRANULAR ORGANOSILANE PREPARATION, PROCESS FOR THE PRODUCTION THEREOF AND USE THEREOF

CROSS-REFERENCE TO RELATED APPLICATION

This application is based on German Application DE 199 55 850.7, filed Nov. 20, 1999, which disclosure is incorporated herein by reference.

FIELD OF THE INVENTION

This invention relates to an organosilane preparation, to a process for the production thereof and to the use thereof.

BACKGROUND OF THE INVENTION

Organosilicon compounds are used in rubber technology. It is known in particular to use sulfur-containing alkoxysilanes, which make excellent coupling agents and reinforcing agents for vulcanizates of rubber compounds containing silicate fillers. These include in particular the organosilanes according to U.S. Pat. No. 3,842,111.

Reinforcing additives for rubber vulcanizates are also known which are produced from the liquid organosilanes of U.S. Pat. No. 3,842,111 and silicate fillers (DE-PS 22 55 577 and U.S. Pat. No. 3,997,356).

All the organosilanes which have so far become established in the art for the stated purpose are hydrolyzable liquids which condense on contact with gaseous or liquid water with alcohol cleavage to yield high-molecular weight polysiloxanes and may thereby lose at least some of their efficacy as reinforcing additives.

In the rubber-processing industry, auxiliary chemicals which are liquid at room temperature, thus also liquid organosilanes, exhibit serious disadvantages in comparison with solid, pulverulent auxiliary chemicals. They require greater effort with regard to storage in silos, weighing and metering. Above all, they exhibit poor miscibility in the production of compounds on roll compounders.

To compensate for these disadvantages, liquid organosilanes are mixed with pulverulent fillers, thereby to obtain pulverulent products. Although this does help, it does not constitute an optimal solution, since pulverulent products are also relatively difficult to incorporate into rubber compounds. Extended compounding times are therefore required. Dusting pollutes and contaminates the environment and machinery. It has additionally been noted that the sensitivity to hydrolysis exhibited by the silanes is not eliminated. In addition, the silanes become markedly less effective if the product is stored. This is expressed, for example, in a reduction in the final crosslinkage values with regard to rubber vulcanization.

Mixtures are also known of organosilanes of the formula

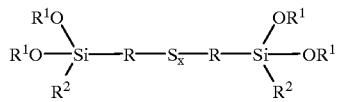

in which:

| $R^1$ | is a monovalent alkyl residue having 1 to 3 carbon atoms |
| $R^2$ | is a monovalent alkyl or alkoxy residue having 1 to 3 carbon atoms |
| R | is a divalent alkyl residue having 1 to 5 carbon atoms and |
| x | denotes a value of from 2.0 to 6.0 | and a filler, which are present as granular preparations and comprise 30–60 wt. % of one or more organosilanes and 70–40 wt. % of one or more carbon blacks (DE 2747277). These mixtures have the disadvantage that they comprise a relatively high fines content and a high content of the pellet fraction smaller than 0.125 mm.

SUMMARY OF THE INVENTION

The object of the present invention is to provide an organosilane preparation which does not exhibit these disadvantages.

The invention provides a granular organosilane preparation comprising a mixture of one or more organosilanes and one or more fillers, which is characterized in that it comprises a fines content of less than 2%, preferably less than 0.5%.

The organosilane preparation may comprise a content of pellets smaller than 0.125 mm of less than 2%, preferably less than 0.5%.

The silane content of the organosilane preparation according to the invention may amount to from 1 to 70 wt. %, preferably 40 to 55 wt. %, relative to the organosilane preparation. The organosilane may comprise any known organosilane, but preferably Si 69, Si 264, Si 230, Si 116, Si 216, Si 203, Si 108, Si 118, Si 208, Si 255, Si 270, Si 275, Si 75, DYNASILAN MTMO or DYNASILAN MEMO, all made by Degussa-Hüls AG, Germany.

The filler content may amount to from 30 to 99 wt. %, preferably 45 to 60 wt. %, relative to the organosilane preparation according to the invention. The filler may comprise rubber blacks or pigment blacks, preferably CORAX N 121, CORAX N 110, CORAX N 242, CORAX N 234, CORAX N 220, CORAX N 375, CORAX N 356, CORAX 347, CORAX N 339, CORAX N 332, CORAX N 330, CORAX N 326, CORAX N 550, CORAX N 539, CORAX N 683, CORAX N 660, CORAX N 774, CORAX N 765, CORAX N 650, CORAX N 762, DUREX 0, CORAX 3, CORAX 4, CORAX 9, CORAX P, PRINTEX P, CORAX S 315, CK 3, CORAX XE-1, PRINTEX L, PRINTEX L 6, CORAX L 29, PRINTEX XE2, FARBRUSS FW 200, FARBRUSS FW 2, FARBRUSS FW 2 V, FARBRUSS FW 1, FARBRUSS FW 18, SPEZIALRUSS 6, FARBRUSS S 170, FARBRUSS S 160, SPEZIALRUSS 5, SPEZIALRUSS 4, SPEZIALRUSS 4A, PRINTEX 150 T, PRINTEX U, PRINTEX V, PRINTEX 140 U, PRINTEX 140 V, PRINTEX 95, PRINTEX 90, PRINTEX 85, PRINTEX 80, PRINTEX 75, SPECIALRUβ 550, PRINTEX 55, PRINTEX 45, PRINTEX 40, PRINTEX 60, PRINTEX XE 2, PRINTEX L 6, PRINTEX L, PRINTEX 300, PRINTEX 30, PRINTEX 3, SPEZIALRUSS 350, PRINTEX 35, SPEZIALRUSS 250, PRINTEX 25, PRINTEX 200, PRINTEX A, SPEZIALRUSS 100, PRINTEX G, FLAMMRUSS 101, all made by Degussa-Hüls AG, described in "Information für die Gummiindustrie" ("Information for the Rubber Industry"), Degussa AG, PT 39-4-05-1287 Ha and "Pigment Blacks" Degussa AG PT 80-0-11-10 86 Ha.

Use of carbon blacks with DBP values greater than 100 ml/100 g is particularly preferred. The carbon blacks may be used in wet-pelletized or dry-pelletized form or as powder.

Moreover, silicas may be used as fillers, preferably ULTRASIL VN3, ULTRASIL VN2, ULTRASIL 3370 or ULTRASIL 7000, all made by Degussa-Hüls AG.

The present invention also provides a process for producing the granular organosilane preparation, which process is characterized in that at least one organosilane is mixed with a filler and a mixing granulator is used as the mixing device. The filler may be apportioned to the mixing granulator by means of gravimetric powder metering. The mixed material may be transported to the outlet by a spiked shaft (FIG. 1). The silane may be apportioned volumetrically or gravimetrically. The silane may be injected by means of one or more nozzles at one or more positions. The mixing temperature may be from 40° C. to 140° C., preferably from 60° C. to 120° C. The speed may vary within the range of from 100 to 1500 rpm, preferably 100 to 1000 rpm. Filler throughput may vary between 10 and 150 kg/h, preferably 20 and 80 kg/h. Power consumption may amount to from 10 to 30 A. Filler throughput for one production installation may vary between 0.5 and 1.5 t/h. The circumferential speed of the spike tips may amount to between 1 and 30 m/s, preferably between 10 and 20 m/s. The residence time of the filler in the mixing granulator may amount to between 20 and 600 seconds.

In addition to the method of injecting the organosilane, the point of injection also has a substantial influence on the quality of the preparation formed.

The mixing granulator consists of a horizontally disposed, stationary tube (stator) with a spiked shaft rotating therein. The mixing granulator conventionally comprises an inlet section, in which the starting filler is fed to the mixing granulator. In this section there is located a conveying screw which imparts an axial movement component to the filler supplied. The inlet section is followed by the granulation section proper, in which the filler agglomerates through the mechanical action of the rotating spikes and by rolling against the internal wall of the stator. After leaving the granulation section, the filler, which is now in pellet-form, reaches the outlet section and is discharged continuously from the mixing granulator.

Depending on the design of the mixing granulator, the individual sections of the mixing granulator may be of different sizes. In any case, the inlet and outlet sections should be kept as small as possible in favor of the granulation section. Once the pulverulent starting filler has entered the granulation section, agglomeration of the filler begins and is complete at the end of this section. To ensure that the organosilane is distributed as homogeneously as possible over the total cross section of the filler pellets, it is necessary to spray the organosilane over the filler in the first third of the granulation section. Introduction of the organosilane at a later stage of pellet formation leads to a non-homogeneous filler pellet structure and thus to reduced pellet hardness.

To incorporate the organosilane into the filler even more homogeneously, a plurality of spray nozzles may be used for spraying, which are distributed about the circumference of the stator in a plane perpendicular to the spiked shaft. The number of nozzles may appropriately be two to five. The nozzles are arranged in a plane perpendicular to the spiked shaft, to ensure good incorporation homogeneity.

The small distance between the spike tips and the internal wall of the stator allows deposits to be prevented to the greatest possible extent. In this way, the silane may be distributed more homogeneously on the filler.

The granular organosilane preparation according to the invention advantageously exhibits better pneumatic conveying, better silo storage properties and better incorporability into rubber than known organosilane preparations.

BRIEF DESCRIPTION OF THE DRAWINGS

The organosilane preparation according to the invention is explained in more detail with reference to the Figures, in which.

DETAILED DESCRIPTION OF THE PREFERRED EMBODIMENTS

Figure 1:
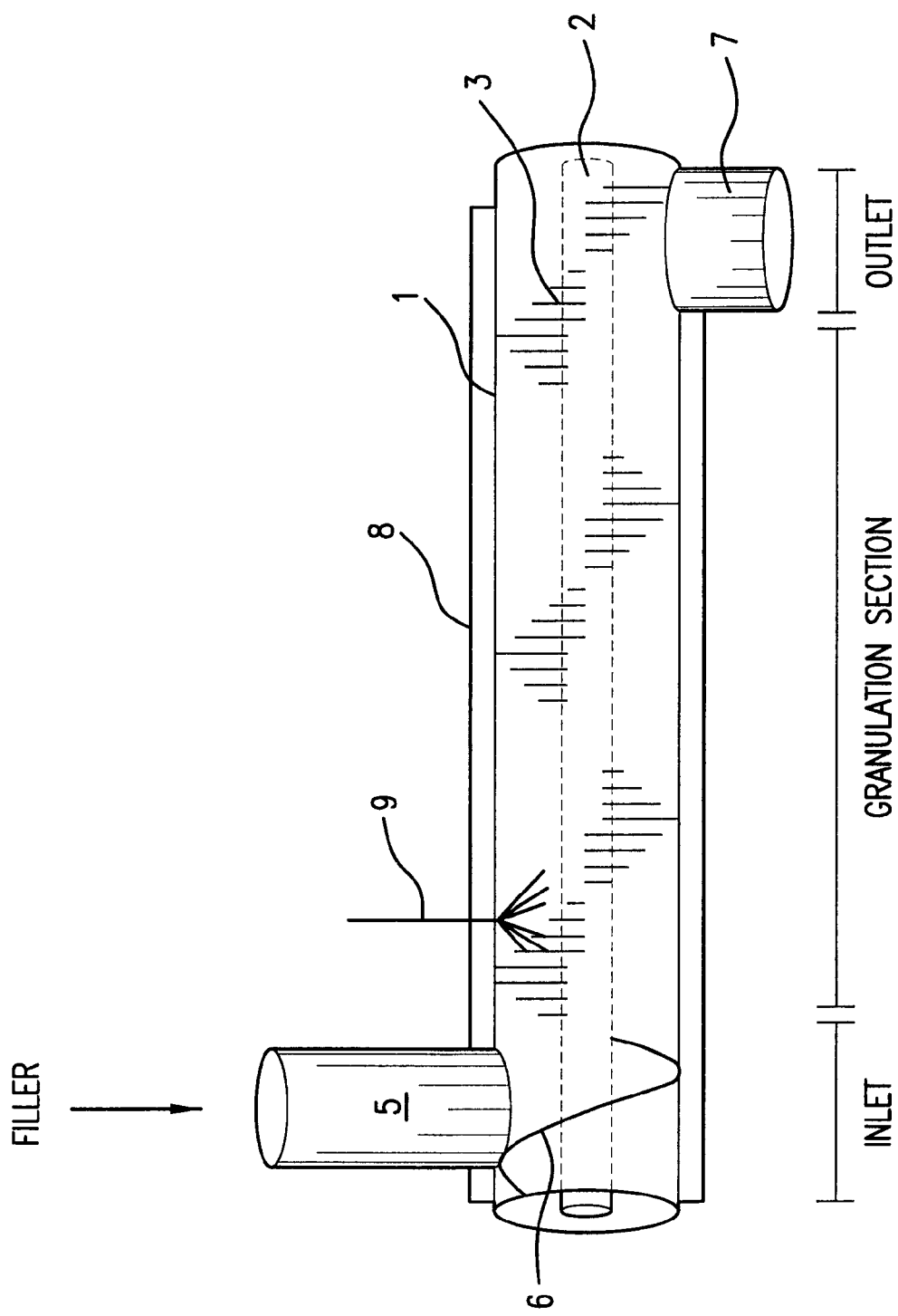
FIG. 1 is a schematic representation of the mixing granulator.

According to FIG. 1, the mixing granulator consists of a horizontally disposed, stationary tube, the stator 1, and a rotating spiked shaft 2 arranged axially therein with helically disposed spikes 3. Between the spiked shaft 2 and the stator 1 there is located the mixing granulator prelleting chamber. The filler is fed to the granulator at inlet 5. In the area of the inlet, located on the spiked shaft 2, there is a conveying screw 6 which conveys the filler in an axial direction towards the outlet 7. The stator 1 is of double-walled construction that allows temperature adjustment of the stator wall by means of a liquid 8 contained between the walls. In the first third of the granulation section of the stator, the upper wall thereof has through-holes, through which are introduced spray nozzles 9 for adding the organosilane.

The granular organosilane preparations are used in vulcanizable rubber compounds.

EXAMPLES

Carbon black N 330 powder is used as the filler. The physico-chemical properties thereof are listed in Table 1.

TABLE 1

| | Bulk density [g/l] | DBP [ml/100 g] | CTAB [m$^2$/g] | Iodine value [mg/g] | Moisture [%] |
| --- | --- | --- | --- | --- | --- |
| N 330 | 77 | 122 | 86 | 93 | 0.5 |

The various test settings for the mixing granulator used are listed in Table 2.

As a Comparative Example, the organosilane preparation according to Example 1 of DE 27 47 277 (corresponding to U.S. Pat. No. 4,128,438) is produced as follows:

10 kg of N 330 are weighed into a trough-shaped powder mixer with a propeller-type mixing tool and a capacity of 150 liters, followed by 10 kg of bis-(3-triethoxysilylpropyl) tetrasulfide (Si 69), and the two are worked thoroughly and homogenised for 25 seconds at 360 rpm. The device used is described in DE-OS 15 92 861.

TABLE 2

| Example | | 1 | 2 | 3 | 4 | 5 |
|---|---|---|---|---|---|---|
| N 330 | kg/h | 25 | 25 | 26.5 | 26.5 | 33 |
| Si 69 | kg/h | 26.4 | 26.4 | 26.5 | 26.5 | 36 |
| Silane content | wt. % | 51.4 | 51.4 | 50.0 | 50.0 | 52.2 |
| Nozzle position | | 5 cm downstream of carbon black powder inlet | | | | |
| Nozzle | mm | 1.3 | 1.3 | 1.3 | 1.3 | 1.3 |
| Nozzle pressure | bar | 4 | 1.5 | 1.5 | 0.8 | 1.5 |
| Mixer speed | rpm | 650 | 650 | 714 | 650 | 550 |
| Mixer power consumption | A | 15.5–16.5 | 16.5–17.5 | 16–17.5 | 15.5–17 | 15.5–18 |
| Mixer temperature | °C. | 100 | 100 | 100 | 100 | 100 |
| End product temperature | °C. | approx 60 | approx 60 | approx 60 | | approx 60 |

The characteristic data of the organosilane preparations obtained are listed in Tables 3 and 4.

TABLE 3

| Method | Unit | Comparative Example according to DE 2747277 (U.S. Pat. No. 4,128,438) | Example 1 | Example 2 | Example 3 | Example 4 | Example 5 |
|---|---|---|---|---|---|---|---|
| Fines content | % | 17.9 | 0.2 | 0.3 | 0.0 | 0.2 | 0.2 |
| Pellet size range | | | | | | | |
| <0.125 mm | % | 21.4 | 0.2 | 0.1 | 0.0 | 0.1 | 0.2 |
| 0.125–0.25 mm | % | 10.1 | 0.4 | 0.4 | 0.2 | 0.8 | 0.5 |
| 0.25–0.50 mm | % | 14 | 2.4 | 3.4 | 1.8 | 4.2 | 2.4 |
| 0.50–0.71 mm | % | 9.9 | 6.97 | 6.6 | 5.5 | 9.7 | 4.5 |
| 0.71–1.0 mm | % | 11.6 | 35.7 | 25.0 | 24.8 | 43.9 | 17.6 |
| 1.0–1.5 mm | % | 15.3 | 45.9 | 58.1 | 64.6 | 39.4 | 56.3 |
| >1.5 mm | % | 17.7 | 8.4 | 6.2 | 3.1 | 1.9 | 18.6 |
| Volatile fractions | % | 0.52 | 0.60 | 0.58 | 0.83 | 0.75 | 0.66 |
| Sulfur content | % | 11.42 | 11.60 | 11.59 | 11.33 | 11.04 | 12.16 |

TABLE 4

| Example | Visual evaluation |
|---|---|
| Example 1 | Variable pelleting with some agglomerates. Colour: dark grey Very good flow behavior |
| Example 2 | Same as Example 1 |
| Example 3 | Uniform pelleting with some agglomerates Colour: dark grey Very good flow behavior |
| Example 4 | Uniform micropellet-type pelleting with some agglomerates. Colour: dark grey Very good flow behavior |
| Example 5 | Very coarse material with some agglomerates Colour: dark grey Very good flow behavior |

The organosilane preparations according to the invention have a markedly lower fines content and a lower content of pellets smaller than 0.125 mm than the Comparative Example according to DE 27 47 277 (U.S. Pat. No. 4,128, 438). Blockage of lines during pneumatic conveying thus need not be expected.

Figure 2A:
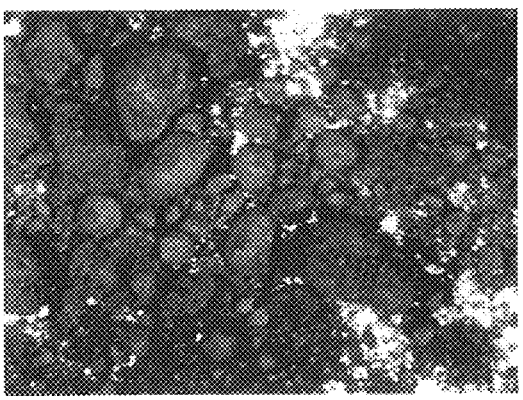
FIG. 2a is a photograph of granules according to the Comparative Example of DE 27 47 277 (U.S. Pat. No. 4,128,438)
Figure 2B:
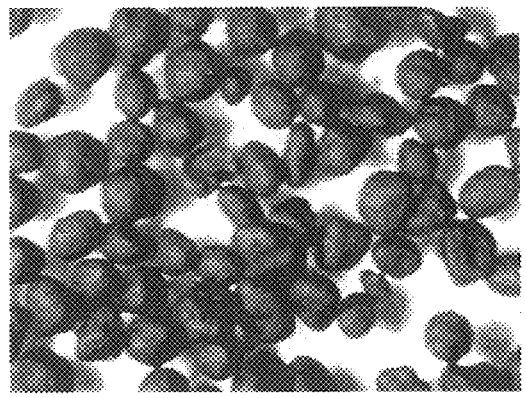
FIG. 2b is a photograph of granules according to Example 4 of the invention.

A comparison of micrographs (8× magnification) reveals, according to FIG. 2, a marked improvement in pellet quality and a lower fines content. Thus, FIG. 2a shows the organosilane preparation according to DE 27 47 277 (U.S. Pat. No. 4,128,438), Example 1, and FIG. 2b shows the organosilane preparation according to the invention in accordance with Example 4.

While the known organosilane preparations cake, the organosilane preparations according to the invention exhibit clear advantages when evaluated visually.

Analysis was performed in accordance with the following standard methods:

| Bulk density | ASTM D1513 |
|---|---|
| DBP | ASTM D2414 |
| CTAB | ASTM D3765 |
| Iodine value | ASTM D1510 |
| Moisture | ASTM D1509 |
| Fines content | ASTM D1508 |
| Volatile fractions | ASTM D1509 |
| Sulfur content | DIN 51400 |

Pellet size distribution is determined as follows:

The sieves (standard U.S. sieves, height 25 mm, diameter 200 mm, mesh size 0.125 mm, 0.25 mm, 0.50 mm, 0.71 mm, 1.0 mm, 1.5 mm) and the collector pan are fitted together in the prescribed sequence, i.e. with the mesh size decreasing from top to bottom. 100 g of the carbon black to be tested is weighed out, using a suitable scoop. Under no circumstances should the carbon black be poured out of the drum, since pellet preselection would then occur. Once the weighed-out carbon black has been transferred to the uppermost sieve, the lid is put in place and the stack is introduced into the sieving machine (Ro-tap No. 704) in such a way that approximately 1.5 mm clearance remains and the sieves may thus rotate freely. The cover plate should be provided with a cork. The sieves are fixed in the machine and then shaken for 1 minute, with the hammer in operation. The sieves are then taken apart in succession and the quantity of carbon black present in each is weighed to an accuracy of 0.1 g.

Evaluation of Silo Storage Behavior

Figure 3A:
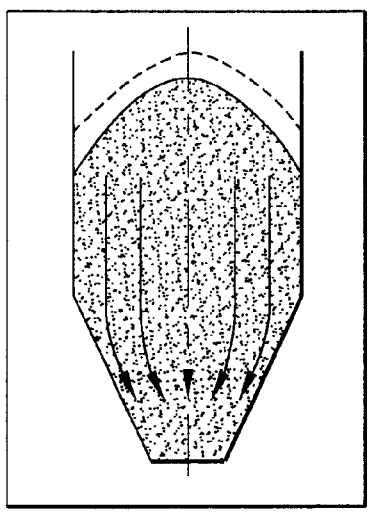
FIG. 3a schematically shows mass flow of bulk material in a silo.
Figure 3B:
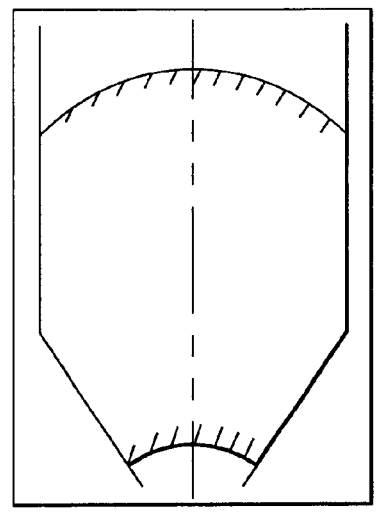
FIG. 3b schematically shows bridge formation of bulk material in a silo.
Figure 3C:
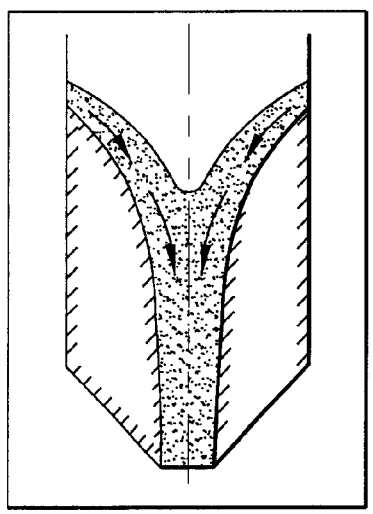
FIG. 3c schematically shows funnel flow of bulk material in a silo.
Figure 3D:
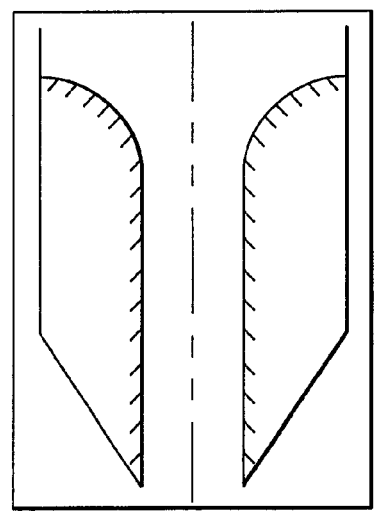
FIG. 3d schematically shows shaft formation of bulk material in a silo.

To ensure trouble-free operation of a silo, the geometry of the discharge hopper must be known. This may be determined by measuring the flow properties of bulk materials and the consolidation behavior thereof during the silo storage period using a Jenike shear apparatus. Process-engineering silo dimensioning provides the angle of inclination $\Theta$ of the hopper wall of an axially symmetrical (round base) or a planar (rectangular base) silo in relation to vertical and the minimum diameter Dmin or minimum width Bmin of the discharge opening, trouble-free operation of the silo being ensured if these parameters are adhered to. If the angle of hopper inclination is as specified or smaller, mass flow (FIG. 3a) is established as the flow profile in the bulk material container on product discharge, i.e. the entire container contents move uniformly. On this basis, material discharge can only be interrupted by the formation of stable bulk material bridges (FIG. 3b). If the diameter of the discharge opening is large enough, it is impossible for a stable bulk material bridge to form on product discharge. If a bulk material consolidates during storage, the minimum diameter of the discharge opening is increased in line with the bulk material consolidation to prevent bridge formation. If mass flow cannot be achieved as the flow profile, funnel flow (FIG. 3c) becomes established as the flow profile. If funnel flow prevails in a bulk materials container, the formation of a stable rathole or shaft (FIG. 3d) may render complete emptying of a silo impossible. The inclination of the hopper wall then has no effect on the discharge behavior of the bulk material and the discharge opening is then dimensioned from the point of view of preventing formation of a stable rathole or shaft.

Jenike's flowability index is commonly used to provide a general description of flowability. The bulk material stability fc alone is insufficient for assessing flowability of a bulk material, since it depends on the consolidation stress σ1. Jenike therefore introduced as a measure of the flowability of a bulk material the ffc value, being the relationship between consolidation stress and bulk material stability.

$$ffc = \frac{\sigma 1}{fc}$$

The lower the ffc value, the less well the bulk material flows. According to Jenike, the following classification applies:

| ffc > 10 | free flow |
| ffc 10–4 | slight flow |
| ffc 4–2 | cohesive |
| ffc < 2 | very cohesive, no flow |

Since the ffc value is dependent on consolidation stress, it is sensible always to apply the same stress level when comparing the flowability of bulk materials.

The parameters necessary for process-engineering silo dimensioning and the flowability index ffc may be determined with shear tests using a Jenike shear apparatus (Messung des Scherweg-/Scherkraftverlaufes bei verschiedenen Normalspannungen und der Bestimmung der Reibungsverhältnisse zwischen Behälterwandmaterial und Schüttgut)[Measurement of the shear path/shear force profile at various normal stresses and determination of the frictional relationships between container wall material and bulk material], (Peter Mertens: Silohandbuch (Silo Handbook), Ernst+Sohn Verlag, Berlin 1988, pp. 50–52).

A shear test of this type allows comparison of the flow and storage behavior of the product according to the invention and of the Comparative Example according to DE 27 47 277 (corresponding to U.S. Pat. No. 4,128,438) and process-engineering silo dimensioning of a silo with an assumed wall inclination of 25° to vertical.

TABLE 5

Instantaneous flow behavior of the Comparative Example according to DE 2747277 (corresponding to U.S. Pat. No. 4,128,438)

| | Shear stress 2580 Pa | | | Shear stress 3850 Pa | | | Shear stress 7020 Pa | | |
| --- | --- | --- | --- | --- | --- | --- | --- | --- | --- |
| | σ1 [Pa] | fc [Pa] | ffc | σ1 [Pa] | fc [Pa] | ffc | σ1 [Pa] | fc [Pa] | ffc |
| Comparative Example DE 2747277 (U.S. Pat. No. 4,128,438) | 5310 | 1380 | 3.8 | 7879 | 1984 | 4.0 | 14270 | 2853 | 5.0 |

TABLE 6

Bulk material stability as a function of storage time for the Comparative Example according to DE 27 47 277 (U.S. Pat. No. 4,128,438)

| | Shear stress: 3850 Pa Bulk material stability fc [Pa] | | | |
| --- | --- | --- | --- | --- |
| Time [days] | 0 | 1 | 3 | 5 |
| Comparative Example according to DE 27 47 277 (U.S. Pat. No. 4,128,438) | 1984 | 2220 | 3300 | 7730 |

TABLE 7

Minimum diameter of discharge opening for assumed axially symmetrical silo with hopper wall inclination θax = 25° for Comparative Example of DE 27 47 277 (U.S. Pat. No. 4,128,438)

| | Minimum diameter of discharge opening Dmin [mm] | | | |
| --- | --- | --- | --- | --- |
| Time [days] | 0 | 1 | 3 | 5 |
| Comparative Example according to DE 27 47 277 (U.S. Pat. No. 4,128,438) | 335 | 380 | 875 | 2640 |

TABLE 8

Instantaneous flow behavior of Example 5

| | Shear stress 2120 Pa | | | Shear stress 3560 Pa | | | Shear stress 6460 Pa | | |
| --- | --- | --- | --- | --- | --- | --- | --- | --- | --- |
| | σ1 [Pa] | Fc [Pa] | ffc | σ1 [Pa] | fc [Pa] | ffc | σ1 [Pa] | fc [Pa] | ffc |
| Example 5 | 5360 | 470 | 11 | 8880 | 820 | 11 | 16010 | 2095 | 7.6 |

TABLE 9

Bulk material stability as a function of storage time for Example 5

| | Shear stress: 3560 Pa Bulk material stability fc [Pa] | | | |
| --- | --- | --- | --- | --- |
| Time [days] | 0 | 1 | 7 | 14 |
| Example 5 | 470 | 640 | 640 | 640 |

TABLE 10

Minimum diameter of discharge opening for assumed axially symmetrical silo with hopper wall inclination θax = 25° for Example 5

| | Minimum diameter of discharge opening Dmin [mm] | | | |
|---|---|---|---|---|
| Time [days] | 0 | 1 | 7 | 14 |
| Example 5 | <30 | 30 | 30 | 30 |

A comparison of the minimum diameters for preventing bridge formation, the bulk material stabilities and the flowability index reveals that the product produced by the process according to the invention exhibits markedly better flow and silo storage properties (Tables 5–10). After two weeks storage, the product flows out of a silo without difficulty. When the Comparative Example according to DE 27 47 277 (U.S. Pat. No. 4,128,438) is stored in a silo, discharge problems arise after storage for only three days.

Evaluation of Conveying Behaviour

Conveying and abrasive behavior in pneumatic conveying installations was evaluated using conveying tests in dilute and dense phase conveying installations. To this end, the material to be conveyed is transported repeatedly in the conveying installations described below with the settings indicated. Abrasive behavior was compared using particle size distributions of the feed and conveyed material and by calculating the balance of the resultant fines.

Dilute Phase Conveying Installation

The dilute phase conveying installation consists substantially of a feed container with a blow-through lock for material feed, a collecting vessel arranged thereabove, a nitrogen supply connection for pressure generation, two cyclones for material separation and a downstream filter. The conveying line is 44 m long, 6.3 m thereof taking the form of a rising line, and the line contains seven 90° bends. The internal line diameter is 56.3 mm. The installation is operated with nitrogen. To achieve better fines separation, only one of the two cyclones is used.

Dense Phase Conveying Installation

The dense phase conveying installation consists substantially of a pressure transmitting container, a hose-type conveying line ($D_{internal}$=60 mm) and a separating container, a dust filter being connected downstream thereof. The conveying length is 39 m, 5.7 m thereof extending in the form of a vertical rising line. The line contains four 90° bends and one 180° bend. The conveying gas (nitrogen) is introduced in two substreams (top air and bottom air) via Laval nozzles.

Tables 11–13 list the conveying conditions/settings.

TABLE 11

Dilute phase conveying, Example 5

| | Test 1 | Test 2 |
|---|---|---|
| Gas mass flow rate [kg/h] | 200 | 300 |
| Volumetric flow rate [m³/h] | 166.7 | 250.0 |
| Pressure loss [mbar] | 225 | 315 |
| Initial weight [kg] | 49.6 | 50.8 |
| Time [mins] | 3.58 | 2.5 |
| Mass flow rate [kg/h] | 831 | 1219 |
| Loading μ [kg solids/kg conveying gas] | 4.2 | 4.1 |
| v, conveying gas [m/s] | 18.8 | 28.2 |
| Gas density [kg/m³] | 1.2 | 1.2 |
| Gas temperature [° C.] | 20 | 20 |
| Total conveying distance [m] | 132 | 132 |

TABLE 12

Dense phase conveying, Test 1

| | Top air | Bottom air |
|---|---|---|
| Nozzle: | 10 | 45 |
| Initial pressure, stat: | 1 bar | 3 bar |
| Initial pressure, dyn.: | 1 bar | 2.5 bar |
| Meter, start | 821.7 | 1683.53 |
| Meter, end: | 821.7 | 1684.1 |
| Time: | 3 min | 2.3 min |
| Volumetric flow rate | 0.0 m³/h | 11.4 m³/h |
| Total volumetric flow rate | 11.4 m³/h | |
| V, measured | m³/h | 12.1 m³/h |
| Conveying pressure | 1.2 bar | 2 bar |
| Initial weight | 46 kg | |
| Mass flow rate | 920 kg/h | |
| Loading μ | 67.3 kg solids/kg conveying gas | |
| v, conveying gas | 1.1 m/s | |
| Gas density | 1.2 kg/m³ | |
| Gas temperature | 20 ° C. | |
| Total conveying distance | 200 m | |

TABLE 13

Dense phase conveying, Test 2

| | Top air | Bottom air |
|---|---|---|
| Nozzle: | 45 | 55 |
| Initial pressure, stat: | 2.8 bar | 3 Bar |
| Initial pressure, dyn.: | 2.2 bar | 2.5 Bar |
| Meter, start | 834.22 | 1688.34 |
| Meter, end: | 824.6 | 1688.65 |
| Time: | 1.25 min | 1.25 min |
| Volumetric flow rate | 18.2 m3/h | 14.9 m³/h |
| Total volumetric flow rate | 33.1 m3/h | |
| V, measured | m3/3 | m3/h |
| Conveying pressure | 2.2 bar | 2.5 bar |
| Initial weight | 51 kg | |
| Mass flow rate | 2448 kg/h | |
| Loading μ | 61.6 kg solids/kg conveying gas | |
| v, conveying gas | 1.1 m/s | |
| Gas density | 1.2 kg/m³ | |
| Gas temperature | 20 ° C. | |
| Total conveying distance | 200 m | |

Tables 14 to 17 list the pass-through values D 90%, D 50% and D 10% for the cumulative pass-through distribution of the conveyed material and the starting material.

TABLE 14

Dilute phase conveying, Test 1

| Pass-through | Starting material | Conveying distance: 42 m | Conveying distance: 132 m |
|---|---|---|---|
| D 10% | 890 | 990 | 900 |
| D 50% | 1270 | 1480 | 1670 |
| D 90% | 1760 | 2200 | 2060 |

TABLE 15

Dilute phase conveying, Test 2

| Pass-through | Starting material | Conveying distance: 42 m | Conveying distance: 132 m |
|---|---|---|---|
| D 10% | 810 | — | 720 |
| D 50% | 1210 | — | 1120 |
| D 90% | 1775 | — | 1670 |

TABLE 16

Dense phase conveying, Test 1

| Pass-through | Starting material | Conveying distance: 39 m | Conveying distance: 195 m |
|---|---|---|---|
| D 10% | 790 | 1080 | 850 |
| D 50% | 1190 | 1510 | 1245 |
| D 90% | 1975 | 2095 | 1810 |

TABLE 17

Dense phase conveying, Test 2

| Pass-through | Starting material | Conveying distance: 39 m | Conveying distance: 195 m |
|---|---|---|---|
| D 10% | 840 | 700 | 650 |
| D 50% | 1240 | 1110 | 1090 |
| D 90% | 1810 | 1610 | 1590 |

The product according to the invention may be conveyed without difficulty and reliably in the dilute and dense phase within the stated limits. Dilute and dense phase conveying up to a conveying gas speed of 28 m/s causes no significant increase in fines content. After dilute phase conveying over a distance of 132 m or dense phase conveying over a distance of 195 m, the material is present in the form of dust-free granules. After pneumatic transportation, the conveyed material exhibits no change in its good bulk material properties.

What is claimed is:

1. A granular organosilane preparation comprising a mixture of one or more organosilanes and one or more fillers, having a fines content of less than 2%.

2. The organosilane preparation according to claim 1, comprising a content of pellets smaller than 0.125 mm of less than 2%.

3. The organosilane preparation according to claim 1, wherein the silane content amounts to from 1 to 70 wt. %, relative to the granular organosilane preparation.

4. The organosilane preparation according to claim 1, wherein the fillers comprise carbon blacks or silicas.

5. A process for producing a granular organosilane preparations according to claim 1, comprising:
   mixing at least one organosilane with a filler, wherein a heatable mixing granulator is used as a mixing device.

6. The process for producing the organosilane preparations according to claim 5, wherein the filler is apportioned by means of gravimetric powder metering.

7. The process for producing organosilane preparations according to claim 5, wherein the silane is apportioned volumetrically or gravimetrically.

8. The process for producing organosilane preparations according to claim 5, wherein the silane is injected by one or more nozzles at one or more positions.

9. The process for producing organosilane preparations according to claim 5, wherein mixing is carried out at a mixing temperature of from 40° to 140° C.

10. The process for producing organosilane preparations according to claim 5, wherein speed of the mixing granulator varies in a range of from 100 to 1500 rpm.

11. A method of using the granular organosilane preparation according to claim 1, comprising:
    adding the granular organosilane preparation to a formulation for vulcanizable rubber compounds.

* * * * *